June 1, 1937.                     A. ERRERA                    2,082,155
                      CASH REGISTER AND COMPUTING MACHINE
                          Filed May 23, 1933            5 Sheets-Sheet 3

Inventor:
Attilio Errera
By Emil Bönnelycke
              Attorney

June 1, 1937.                A. ERRERA                    2,082,155
                  CASH REGISTER AND COMPUTING MACHINE
                       Filed May 23, 1933        5 Sheets-Sheet 4

Inventor:
Attilio Errera
By Emil Bonnelycke
Attorney

Patented June 1, 1937

2,082,155

UNITED STATES PATENT OFFICE 2,082,155

CASH REGISTER AND COMPUTING MACHINE

Attilio Errera, Turin, Italy

Application May 23, 1933, Serial No. 672,495
In Italy June 11, 1932

4 Claims. (Cl. 235—46)

This invention relates in general to cash registers and computing machines and more particularly has reference to cash registers and computing machines provided with mechanism for issuing tickets or receipts containing a printed amount alone or together with a printed character, indicia, word or abbreviation, indicating the service for which the ticket is purchased or the merchandise for which the ticket or receipt is issued.

The major object of this invention is to provide a cash register or computing machine adapted to issue a printed ticket or receipt and equipped with master keys with means for effecting by the manipulation of a single master key the simultaneous setting in or entering in the machine by a single operation of a numerical amount composed of one or more digits which in an ordinary cash register would require the use of a plurality of keys.

Another object of this invention is to provide a cash register or computing machine adapted to issue a printed ticket or receipt and equipped with master keys with means for effecting by the manipulation of a single master key the simultaneous setting in or entering in the machine by a single operation of a numerical amount composed of one or more digits which in an ordinary cash register would require the use of a plurality of keys and also the setting in or entering in the machine of the desired characters or indicia to be printed on the ticket with the numerical amount by the same single operation.

A still further object of this invention is to provide a cash register or computing machine adapted to issue a printed ticket or receipt and equipped with a plurality of master keys with means for effecting by the manipulation of one of said master keys the simultaneous setting in or entering in the machine by a single operation of a numerical amount composed of one or more digits which in an ordinary cash register would require the use of a plurality of keys and also the setting in or entering in the machine of the desired characters or indicia to be printed on the ticket with the numerical amount by the same single operation and in which the master keys are removable and replaceable by other master keys constructed for setting in or entering any desired number capable of being entered in the machine.

A still further object of this invention is to provide a cash register or computing machine adapted to issue a printed ticket or receipt and equipped with a bank of keys for effecting by the manipulation of one of such keys the entering in the machine of any separate digit and character within the machine range, and also equipped with master keys with means for effecting by the manipulation of one of said master keys the simultaneous setting in or entering in the machine by a single operation of a numerical amount composed of a plurality of digits and also of characters which would require the use of a plurality of keys of said bank.

Yet another object of the invention is to provide a cash register or computing machine with means for counting the number of operations effected by each of the master keys.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

In accordance with the present invention, a plurality of groups of plates are provided for cooperation with members for setting in or entering numerals and characters in the machine to transmit setting in or entering motion to said setting in or entering members, these members being arranged in rows and columns in the machine. A plate is provided for each member and the plates for members being in the same row in all of the columns are grouped. For instance, the plate associated with digit 2 in the tens column, digit 2 in the units column, digit 2 in the tenths column, and digit 2 in the hundredths column, are all grouped together. The various plate groups are arranged in superposed relation so that a plurality of openings formed in each of the plates will be in perfect alignment. The plates for setting in or entering the tens digits have teeth or lugs associated with the plurality of openings formed therein. The plates for setting in or entering the units have similar teeth positioned somewhat differently, and the plates for setting in or entering the tenths and hundredths are similarly provided with teeth which are respectively still differently positioned. The teeth in the plates for setting in or entering any particular column of digits are all identically positioned.

A master key provided with cam surfaces is threaded through any aligned row of openings and the cams formed thereon are located to engage with the teeth of predetermined plates and with the tooth of one plate only in respect of each column of said entering members, for instance, with only one tooth of a tens plate, units plate, tenths plate, and hundredths plate, respectively. In this instance, by depressing this master key one tens plate, one units plate, one tenths plate, and one hundredths plate are simultaneously shifted to effect setting in or entering of the desired digits. The machine is so designed that the number of ordinal places is determined by the number of plates and the number of numerical quantities is determined by the number of master keys. Of course, when either or any of such plates is not to be operated, the respective cam or cams of the master key is or are omitted.

Since usually there are a certain few multi digit numbers entered by a particular operator such as, for instance, a ticket seller, only a few master keys are required, but if necessary as many master keys as desired may be used and interchanged with others for setting in or entering selected numbers.

Further, any desired item or digit, capable of being entered by the machine but not provided for by the particular master keys embodied in the machine may be set in or entered by means of independent keys provided for that purpose, each actuating one of said setting in or entering members separately.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 18 is a diagrammatical fragmentary section of means for interlocking the manipulating members, on line 18—18 of Figure 20;

Figure 20 is a fragmentary diagrammatical section on line 20—20 of Figure 19;

Figure 21 is a fragmentary diagrammatic section on line 21—21 of Figure 18 showing means for operation of counters by said manipulating means.

Figure 25:
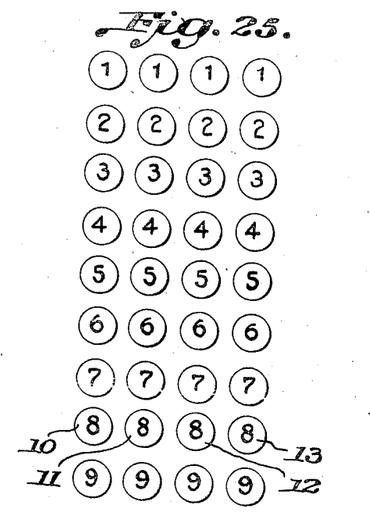
Fig. 25 is a schematic representation of the keyboard of the machine of the present invention.

For the purpose of describing the present invention, a cash register is illustrated and described which comprises means for making entries in four columns, that is for effecting entries of items four digits. In other words, the cash register is provided as shown in Fig. 25 with keys 10, 11, 12, and 13 so that entries may be made of values varying from 0000 to 9999.

Figure 26:
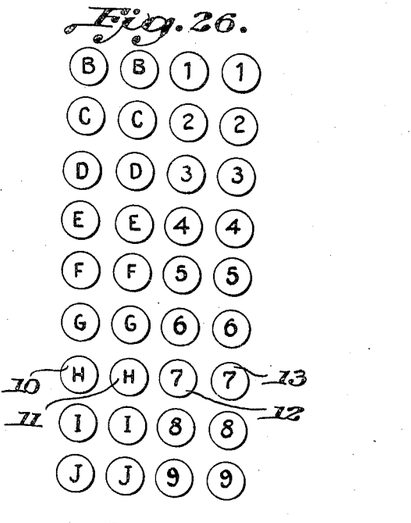
Fig. 26 is a view similar to Fig. 25, illustrating a modification of the present invention.

Of course, the machine may be organized to deal with entries over a larger number of columns and if desired, a number of the sections of the machine, instead of being used to set in or enter figures, may be used to set in or enter other characters, indicative of classes of services, kind of articles, or other characters having a defined relation with figures or characters of other columns or devices. For instance, as shown in Fig. 26 certain of the keys (i. e., columns 10 and 11) may be designed to enter letters so that an item such as "BD69" could be entered.

In the embodiment illustrated the machine comprises four columns of setting in or entering members, each of these columns including figures 0, 1, 2, 3, 4, 5, 6, 7, 8, 9. As usual in computing and equivalent machines, 0 is set in or entered and printed automatically in any column in which no figure has been set in or entered by the operator, the means for this purpose being only diagrammatically shown in the drawings and represented by finger 53 which engages stop 52 of pawl 46 as hereinafter described in detail.

Figure 1:
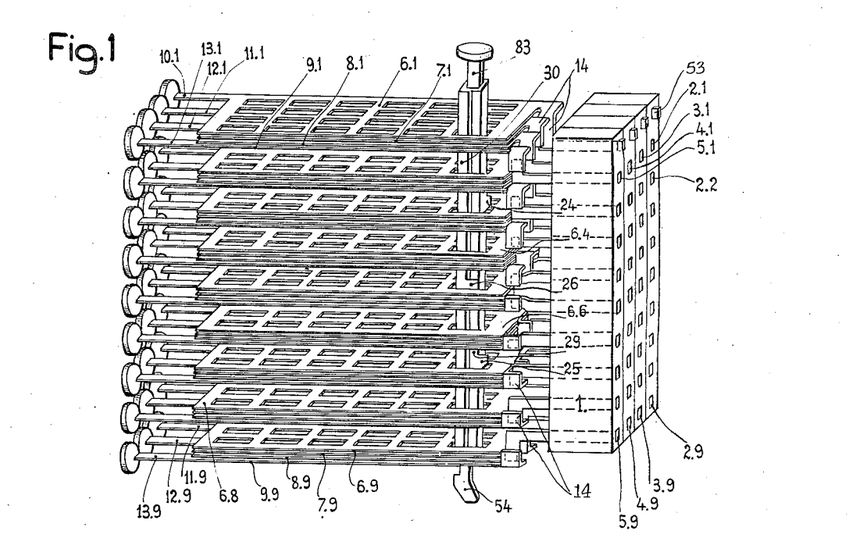
Figure 1 is a diagrammatic perspective view of the essential parts of the setting-in means of a cash register according with this invention.

In Fig. 1 the assembly of setting in or entering members comprises a guide frame 1 in which fingers 2.1, 2.2, ... 2.9; 3.1 ... 3.9; 4.1 ... 4.9; 5.1 ... 5.9 are mounted to reciprocate; each of said fingers is actuated by a setting in or entering member consisting of a reciprocating plate 6.1, 7.1, 8.1, 9.1 ..., 6.9, 7.9, 8.9, 9.9 actuated by an individual manipulating member or key 10.1, 11.1, 12.1, 13.1 ..., 10.9, 11.9, 12.9, 13.9.

Frame 1 with fingers 2 ... 5 and respective actuating members 6 ... 9 connected therewith provide in their whole the equivalent of usual setting or entering members of cash registers and said fingers are provided each with a return spring (not shown) operative between it and frame 1 to resiliently hold said finger and respective plate in the illustrated position, which is conventional as shown by British Patent No.

Figure 3:
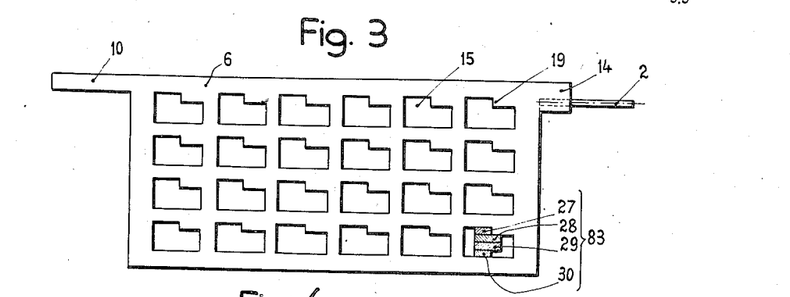
Figure 3 shows a separate part of the register.
Figure 4:
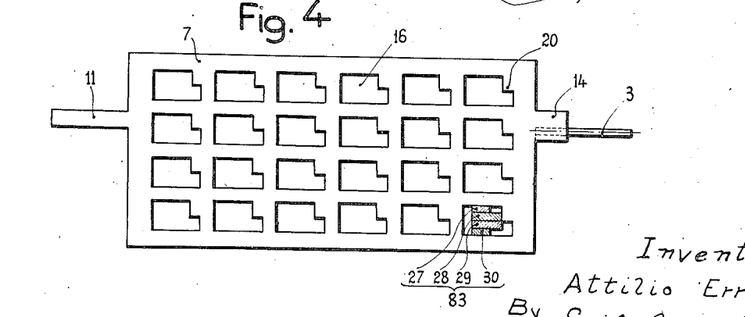
Figure 4 shows another separate part of the register.

9400/1897 (Figs. 1 and 4) and French Patent No. 616,322 (element 32, Fig. 3).

As apparent from Figure 1, the four plates 6.1, 7.1, 8.1, 9.1 are intended to set in or enter digit 1 in several columns of tens, units, tenths and hundredths, the plates 6.2, 7.2, 8.2, 9.2 are intended to set in or enter digit 2 in said columns and so on, but in the following specification the whole of said plates is referred to as plates 6, 7, 8, 9 as they operate in a similar manner. The same remark applies to keys and other parts some of which are referred to by their reference with a digit 1 ... 9 affixed thereto to evidence the particular digit they are devoted to in their operation.

Each of said plates 6, 7, 8, 9 comprises a lug 14 which acts on the respective finger when a particular plate is shifted, without acting on other fingers. The lugs 14 are connected to the respective fingers by welding the vertical portion 14' of lugs 14 being provided to give a broader welding surface. The manipulation of the several keys 10, 11, 12, 13 serves for setting in or entering any desired digit and amount in the machine.

The several plates 6, 7, 8, 9 may be actuated in selected groups by means of a manipulating item key 83 having means arranged to cooperate only with those plates 6–9 associated with the figures providing the item or amount to be set in or entered by such key in the machine. For instance, if 43.25 is to be set in or entered in the machine, the key is provided with four cam lugs positioned to actuate only plates 6.4, 7.3, 8.2, and 9.5, respectively. Said manipulating keys may be in any desired number, as permitted by the construction of the particular machine, and each of them is constructed to set in or enter the desired item or amount in the machine.

For this purpose, each plate 6, 7, 8, and 9 includes a number of slots 15, 16, 17, and 18, respectively (see Figs. 3, 4, 5, and 6). All of said slots in each given plate are identical with each other.

In the embodiment shown, there are nine groups of plates, each group containing four plates, thus making it possible to enter four digits at a time. The slots in the nine plates designated by reference numeral 6 are identical and like slot 15 of Fig. 3. The slots formed in the nine plates 7 are all like slot 16 of Fig. 4, the slots formed in the nine plates 8 are all like slot 17 of Fig. 5, and the slots formed in the nine plates 9 are all like slot 18 of Fig. 6.

It will be noted that the slots of all plates are somewhat similar, differing only in the tooth or lug formed in the right portion thereof, which is described more in detail hereinafter. This permits all of the plates to be assembled with the slots substantially aligned, so that operating keys 83 may be threaded through the slots of all plates.

The number of slots 15, 16, 17, 18 in each plate 6, 7, 8, 9 corresponds with the number of predetermined items or amounts for which the machine is designed.

Figs. 3, 4, 5, and 6 show the configuration of the four plates 6, 7, 8, 9 of each group. Each of said plates includes a series of slots 15, 16, 17, 18 each having a projecting tooth 19, 20, 21, 22 adapted to cooperate with a tooth 23, 24, 25, 26 of the key 83. As shown in the drawings, slots 15, 16, 17, 18 embody a region having the same contour in the several plates to permit for the free respective reciprocation of the stem of the key 83, as well as to provide for the free reciprocation of the plates. Furthermore, said teeth 19, 20, 21, 22 are staggered in the several plates of each group as 6.1, 7.1, 8.1, 9.1 and they are identical and located in the same respective position in the plates which correspond with each other in the several groups as 6.1, 6.2, 6.3 ..., so that the key 83 as hereinafter described may impart an independent action to any plate of any group.

Each manipulating key 83 adapted to enter a predetermined amount or item consists of parts 27, 28, 29, 30, whose number is equal to that of the plates 6, 7, 8, 9 of each group, and each of said parts may comprise a cam or slope tooth 23, 24, 25, 26 having such a position in the cross-section of the key 83 as to cooperate with one of the plates belonging to different orders or columns of digits. Further, each tooth has such a position on the longitudinal extent of the key 83 as to actuate such plate 6, 7, 8, 9 in a single one of said several groups. Therefore, for each column of fingers 2, 3, 4, 5, said key 83 acts on the particular plate 6, 7, 8, 9 which actuates the finger 2, 3, 4, 5 corresponding with the particular digit to be set in or entered in the machine in a particular column.

When key 83 is required to actuate plates for effecting various operations besides the setting in or entering of numbers by the plates corresponding with the numeral, it is of course provided with required teeth located in an appropriate manner. In Figs. 3–6, the key 83 actuates by its part 27 a plate 6 in the tens column, by its part 28 it actuates a plate 7 in the units column, by part 29 a plate 8 in the tenths column, and finally by part 30 one of the plates 9 in the hundredths column.

Any desired numerical value within the range of the machine may be set in or entered by one of the keys 83. Of course, a separate key 83 must be provided for each value to be set in or entered. In practice, the apparatus according to the present invention is widely used by ticket sellers who sell tickets for various determined amounts. For instance in the case of a theater box office, there may be tickets sold at twelve different prices. For such use, twelve keys 83, each constructed to set in or enter a different amount in the machine, would be required.

If the prices are changed, the keys 83 may be replaced by other keys 83 each constructed to set in or enter the amount of a new price in the machine.

More or less keys 83 may be required, depending on the use to which the machine is to be put. In the drawings, twenty-four apertures are provided in the plates, and therefore twenty-four master keys may be used and twenty-four predetermined amounts may be set in or entered, but if the service in which the machine is to be placed requires more than twenty-four predetermined amounts and master keys as 83, the machine may be made with plates having the necessary number of apertures.

When the operator manipulates a particular key 83 corresponding with a predetermined item or amount, which is assumed to include four digits, said key shifts four plates 6, 7, 8, 9 (or a less number thereof should one or more of the figures be a 0). Each of said plates 6, 7, 8, 9 corresponds with a different column of the series of columns of fingers 2, 3, 4, 5 and may correspond with any of digits 1–9 of each column. Therefore, by the manipulation of a single key 83, which corresponds with the desired item or amount, a plate 6, 7, 8, 9 pertaining to the desired digit (1 to 9) is shifted respectively in first, second, third and fourth column, and thus fingers 2, 3, 4, 5 are shifted in the same manner as they would do should four usual keys 10, 11, 12, 13 of the machine be separately manipulated, that is the same operation is secured as would be obtained should the operator actuate a key in each of the columns of tens, units, tenths and hundredths respectively.

When one or more of the orders or columns of fingers 2, 3, 4, 5 corresponds or correspond with characters other than figures, the plates which have been shifted in said orders or columns will set in or enter these characters in the machine for printing. These characters are then printed adjacent to the amount or item set in or entered in the machine by other plates 6, 7, 8, 9.

Figures 6, 7, 8, 9, 10, 11, 12, 13, 14, 15, 16, 17:
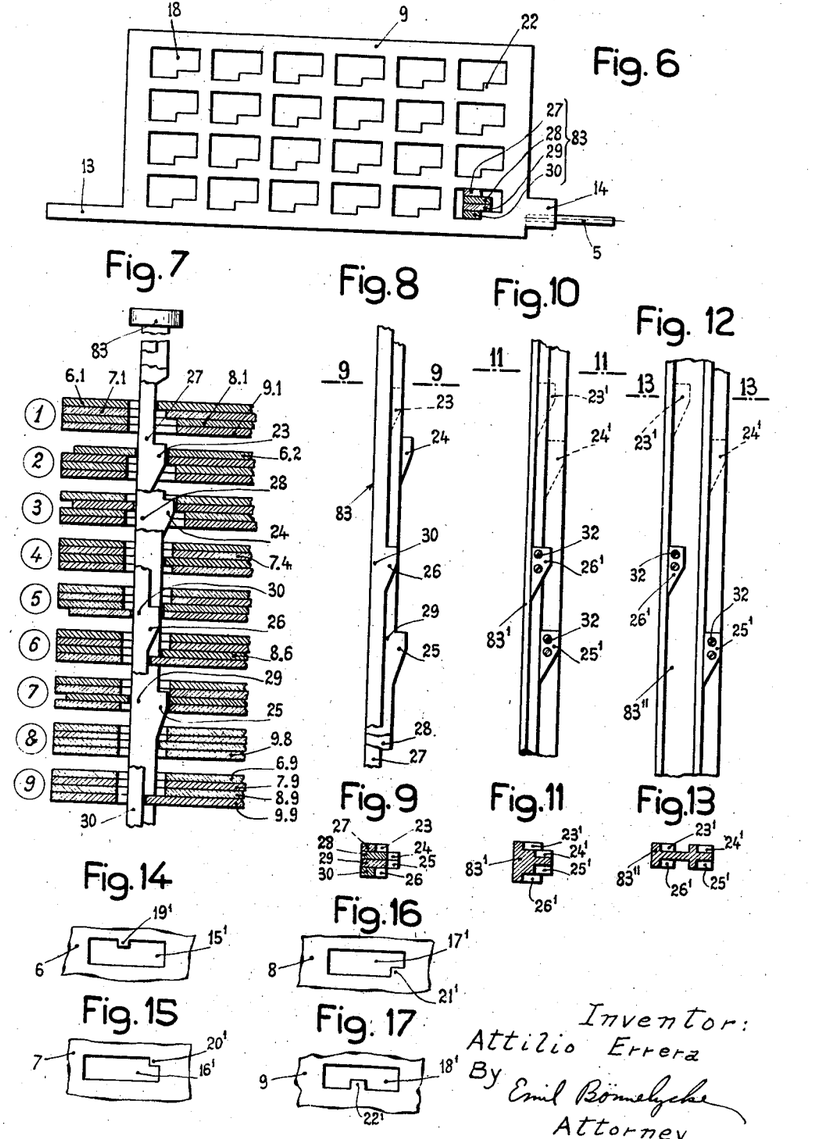
Figure 6 shows a still further separate part of the register.
Figure 7 is a fragmentary and diagrammatical vertical section of several groups of setting in or entering members in cooperation with their respective manipulating members.
Figure 8 is a fragmentary side view of a manipulating member.
Figure 9 is a sectional view on line 9—9 of Figure 8 of said manipulating member.
Figure 10 is a fragmentary side view of another construction of manipulating member.
Figure 11 is a section on line 11—11 (Figure 10) of the manipulating member of Figure 10.
Figure 12 is a fragmentary side view of a further construction of manipulating member.
Figure 13 is a section of the manipulating member of Figure 12 on line 13—13 thereof.
Figure 14 is a fragmentary view of a portion of an setting in or entering member with means for cooperation with the manipulating member of Figures 12 and 13.
Figure 15 is a fragmentary view similar to Figure 14 of a portion of another setting in or entering member.
Figure 16 is a fragmentary view similar to Figure 14 of a portion of a further setting in or entering member.
Figure 17 is a fragmentary view similar to Figure 14 of a portion of a still further setting in or entering member.

In Fig. 7 of the drawings, characters 1, 2, 3 ... 9 marked within a circle at a side of each group of plates 6, 7, 8, 9 show the digits of the rows of the assembly of Fig. 1 which are set in or entered in the machine in the several columns by the actuation of the plates of the respective group. Further in the drawings parts or sections of the key 83 are partially removed in order to illustrate throughout the different points of the key the cooperation of its several parts or sections with cooperating plates. In Fig. 7, a key 83 constructed to set in or enter in the machine the amount or item 23.75 is shown depressed and tooth 23 of key part 27 has shifted plate 6 of the second group to set in or enter digit 2 in the column of tens, the tooth 24 of key part 28 has shifted plate 7 of the third group to set in or enter digit 3 in the column of units, and teeth 25 and 26 of key parts 29 and 30 have respectively shifted plate 8 of the seventh group in the column of tenths and plate 9 of the fifth group in the column of hundredths. None of the plates of groups 1, 4, 6, 8, 9 has been shifted.

Thus by manipulating a single key 83 the digits providing the desired combined amount or item are set in or entered in the machine. As intimated, the combined or predetermined amount or item includes four digits in the case now exemplified, but it could include any number of digits within a maximum number depending upon the number of sliding plates 6, 7, 8, 9 in each group.

Of course, the number of combined or predetermined amounts which may be set in or entered in the machine depends upon the number of slots of the plates of several groups and upon the number of keys 83 used in the machine.

Each of the keys 83 may consist of strips 27, 28, 29, 30 having a suitable cross section and fastened on the side of each other as shown in Figs. 8 and 9. If desired, each key may include a bar 83' having a cross section which will not engage any of the teeth of any of the plates. In this form of construction separate teeth 23', 24', 25', 26' adapted to actuate the plates in the desired columns are fastened on said bar by means of screws 32 as illustrated in Figs. 10 and 11.

It is also possible to arrange the operative members of the key as shown in Figs. 12 and 13. In this instance, the bar 83'' of the key may include two T-shaped sections to which teeth 23', 24', 25', 26' are fastened in the desired locations on said sections.

When keys 83, constructed as shown in Figs. 12 and 13, are employed, the slots or apertures in plates 6, 7, 8, and 9 must be formed differently from those previously described. Figs. 14, 15, 16, and 17 illustrate the positions which the teeth or lugs 19', 20', 21' and 22' occupy in the slots 15', 16', 17', and 18', respectively. When a key such as shown in Figs. 12 and 13 is threaded through aligned apertures 15', 16', 17', and 18', the teeth or cams are positioned so that 23' will engage tooth 19' in one of the plates 6, 24' will engage tooth 20' in one of the plates 7, 25' will engage tooth 21' in one of the plates 8, and 26' will engage tooth 22' in one of the plates 9.

The operation of the device in its embodiment in a cash register is hereinafter described.

Figures 2, 5:
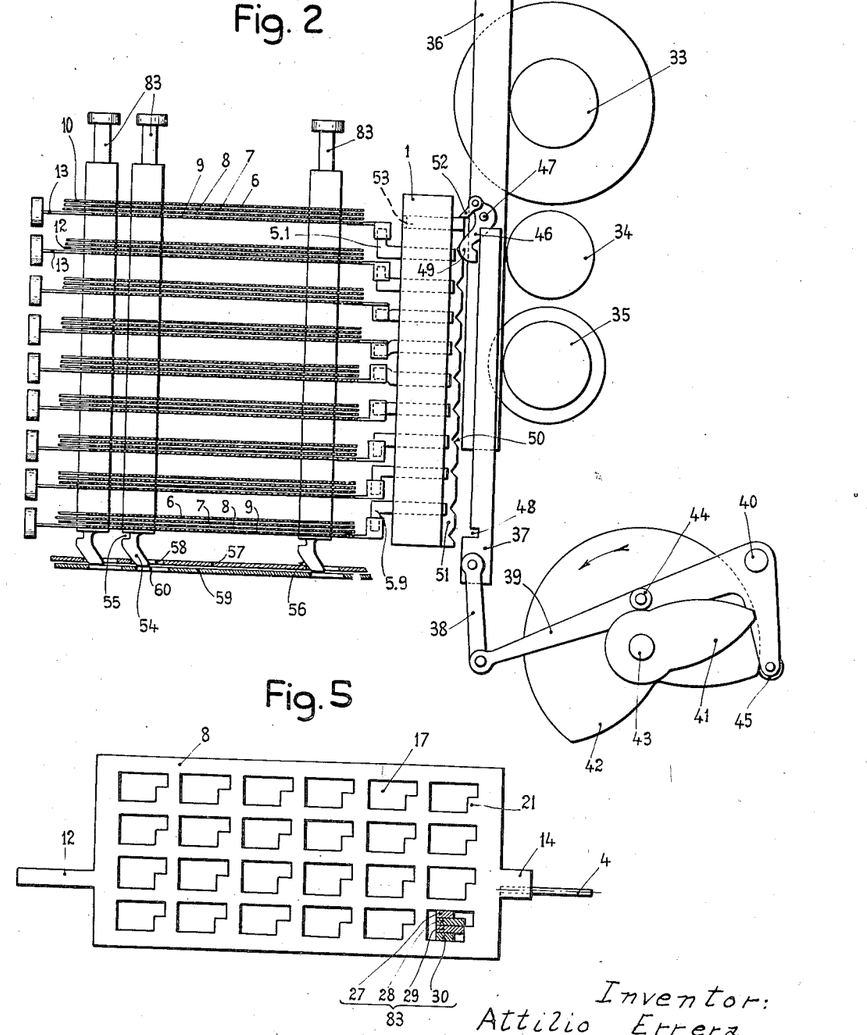
Figure 2 is a diagrammatic view of the essential parts of a cash register.
Figure 5 shows a further separate part of the register.

In the illustrated construction, the members 33, 34, and 35 (Fig. 2) diagrammatically represent pinions intended to drive conventional indicating, printing and totalizing devices usually embodied in cash registers, as illustrated in Figs. 1 and 2 of British Patent No. 9400/1897, in Fig. 4 of French Patent No. 616,322, and in Fig. 5 of the aforementioned British patent, said members 33, 34, and 35 corresponding, respectively, with the parts K, 34 and D² of the above patents, respectively. The pinions 33, 34 and 35 are operated by slides 36 provided with rack teeth (not illustrated because of diagrammatic showing) which mesh with said pinions. The slides 36 correspond to the toothed segments I of the above British patent in that they mesh with pinions for driving indicating printing and totalizing devices. A separate slide 36 is provided for each column of figures or characters. The slides 36 are actuated by a carriage 37 which is connected by link 38 with one arm of a bell-crank lever 39 fulcrumed at 40. Cam followers 44 and 45 are carried by the arms of lever 39 in engagement with cams 41 and 42, respectively, which are fixed on shaft 43. Upon rotation of shaft 43, the cams 41 and 42 will cause lever 39 to rock about its fulcrum and impart reciprocatory movement to carriage 37.

Each slide 36 has a pawl 46 fulcrumed thereon at 47 which is adapted to engage a notch 48 provided in carriage 37 for connecting the slide to the carriage, so that the slide will be moved together with the carriage. Pawl 46 has a nose 49 adapted to cooperate with notches 50 in a bar 51 carried by frame 1 and a pawl stop 52 adapted to engage one of the pins or fingers 2, 3, 4, 5 which has been shifted into operative position by the setting in or entering operation.

When none of the pins or fingers are shifted to a position to engage the stop pawl 52, the latter is engaged by a finger 53 which, upon entering a digit in the column, is removed by a mechanism corresponding to that indicated by reference characters 30, 32, 34, and 35 in Fig. 4 of French Patent No. 551,417 and described in lines 50-55 of page 3 thereof, the part 35 of this patent corresponding to the element 53 of the present application.

When a set in or entering operation is carried out by manipulating either of keys 83 (or 10, 11, 12, 13), one of the fingers 2, 3, 4, 5 of the different columns is moved forward towards its cooperating slide 36 and then the cam shaft 43 is operated for an upward and a subsequent downward stroke in the operation of the cash register. In said upward stroke of the carriage 37 the nose of pawl 46 of cooperating slide 36 (such slide having the position in which it has been left at the end of a previous operation of the machine) engages notch 48 and therefore said slide 36 is moved back into its 0-position by carriage 37.

Thereafter, the slide 36 is driven by the carriage 37 into its downward motion until the pawl stop 52 of its pawl 46 engages that of fingers 2, 3, 4, 5 which has been shifted in the respective column. Then said pawl 46 of the slide 36 is released from carriage 37 and such slide is left stationary at a position whose distance from 0-position corresponds with the numerical value which has been set in or entered in the respective position and column. In their downward stroke the several slides 36 actuate the devices 33, 34, 35 to an extent proportional with the numerical value which has been set in or entered in the respective column.

The described device may include keys actuating separately the several plates 6, 7, 8, 9 in order to enable the operator to set in or enter in the machine any arbitrary amount, by separate figures. An arrangement of this kind is illustrated diagrammatically in Fig. 1 where plates 6, 7, 8, 9 are provided, besides slots 15, 16, 17, 18 with keys 10, 11, 12, 13 separately operating them.

It is preferable that the keys 10, 11, 12, 13 operate the cooperating plates 6, 7, 8, 9 only by thrust and are independent from them in order to prevent said keys 10, 11, 12, 13 from being shifted when one of the master keys 83 is actuated and to permit for an interengagement of the several manipulating parts as hereinafter described. Such an arrangement is shown diagrammatically in Fig. 18 where each plate 6, 7, 8, 9 is provided with a lug 31 which is adapted to be operated only by thrust by the cooperating key 10, 11, 12, 13.

Figure 19:
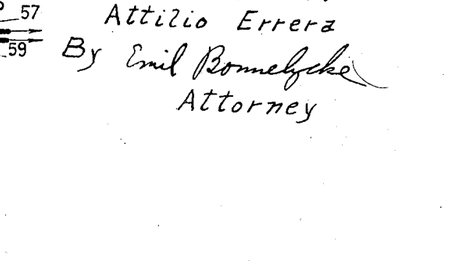
Figure 19 is a diagrammatical fragmentary section of means for interlocking the manipulating members, on line 19—19 of Figure 20.

The described apparatus is provided with engaging means to hold each key in its operative position along the full duration of operation, as well as with interlocking means for preventing operation of other item keys 83 when one of them has been manipulated. Figs. 18 and 19 show an arrangement directed to prevent the manipulation of any of usual or figure-keys 10, 11, 12, 13 when any of item-keys 83 has been manipulated, and vice versa. This mechanism will be described in detail hereinafter.

The machine also includes means for counting the operations of the several item-keys 83 to ascertain the number of times each of said keys has been manipulated for the purpose of checking the number of tickets issued thereby and the money cashed thereon.

To engage each item-key 83 in the position it has been carried, each of said keys is provided (Fig. 18) with a tail 54 having a notch 55 and a slope 56 while a plate 57 is mounted to reciprocate in the machine frame and has a slot 58 in register with each key 83 said slot being intended to provide for the motion of tail 54 therethrough. Said plate 57 is under the action of a return spring (not shown) acting thereon in the direction of the arrow. When a key 83 is manipulated for setting in or entering its respective item, the slope 56 of its tail 54 on entering the slot 58 causes the plate 57 to move back, said plate being thereafter restored in the direction of arrow and becoming thus engaged with the key-notch 55. Thus said key is held in its depressed position until plate 57 is shifted at the end of the operation carried out by the machine, by a conventional device corresponding to the mechanism indicated by reference characters 117, 118, 120, and 94 of Fig. 5 of U. S. Patent No. 1,527,601, said mechanism being actuated by a cam on shaft 43.

Plate 59 which is acted on in the direction of arrow affixed thereto by a return spring not shown, is directed to prevent the manipulation of any other item keys 83 on any of them having been manipulated. For such a purpose the plate 59 is provided in register with each key 83 with a slot 60 providing for the passage of the key slope tail 54 therethrough; said item-key slope-tail 54 on acting on plate 59 moves it against the arrow to shift other slots 60 of plate 59 off from register with tails 54 of other item-keys 83 and to carry an imperforate portion of said plate under said tails to prevent the manipulation of keys 83.

In cooperation with separate figure-keys 10, 11, 12, 13 intended for separate actuation of plates 6, 7, 8, 9 a locking plate 61 is provided, which is subject to a spring and acts to engage the manipulated one of said keys in its manipulated position.

Finally, the whole of keys 10, 11, 12, 13 are under the control of a locking plate 62 (Figs. 18, 19, and 20) intended to engage notches 63 of all said keys when any of the item-key 83 has been manipulated. Said plate 62 is under the control of arm 64 of bell crank lever 64, 65 whose opposite arm 65 is shifted by mutual locking plate 59 of the item-keys after a certain lost motion of said plate, the manipulation of any of item-keys 16 locking all said keys 10, 11, 12, 13 by means of plate 62.

Finally, all the keys 10, 11, 12, 13 by their cam portions 66 drive a sliding plate 67 which by means of an arm of a bell crank lever 68, 69 causes a partial stroke of plate 59 under tails 54 of keys 83 when either of keys 10, 11, 12, 13 has been manipulated, all the item-keys 83 being then locked.

As shown in Fig. 21, a counter represented diagrammatically by 70, 71, 72, 83 is provided in respect of each item-key 83 to enter the total number of manipulations of the respective key. For such a purpose, a lever 74, 75 is provided in respect of each key 83, said lever being fulcrumed at 78 and being actuated by the tail 54 of its respective key 83. Each lever 74, 75 actuates by means of a cooperating rod 79 a pawl 80 fulcrumed at 82 on a cross bar 81 which is reciprocated after the manipulation of each key 83 by the general operation of the machine. Cross bar 81 is actuated by motion transmitted from shaft 43 by mechanism corresponding to that shown in Fig. 20 of French Patent No. 551,417 for transmitting motion from shaft 100 to cross bar 218.

Each counter 70–73 may be of the kind illustrated in German Patent No. 107,339 dated May 24, 1898, the arm o of the device shown in said German patent being arranged to be engaged by the respective pawl 80 which has been shifted upwardly (as illustrated in respect of counter 71) by the operation of respective rod 79, lever 74, 75 and key 83, and driven by said pawl on the bar 81 being reciprocated.

In the described machine the operation of the setting-in members or plates depends merely on the location of actuating teeth 23, 24, 25, 26 (or 23', 24', 25', 26') on the manipulating member or key 83 and is independent of the position said key 83 has in the keyboard that is it does not depend upon the particular slot of the groups of plates 6, 7, 8, 9 it is located in. Therefore said keys 83 may be arranged in any preferred order and in any manner as may be desired for a convenient and proper operation of the machine.

Figure 22:
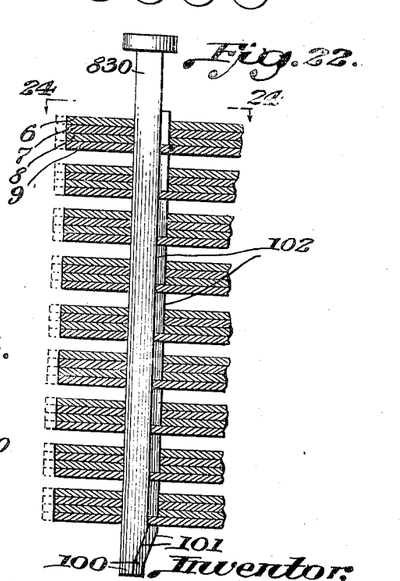
Fig. 22 is a detailed view in section illustrating a side view of a master key.
Figures 23, 24:
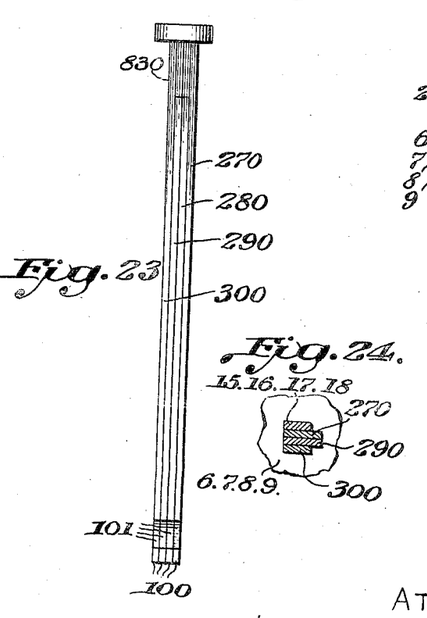
Fig. 23 is an end view of a master key such as shown in Fig. 22.
Fig. 24 is a fragmentary sectional view taken on line 24—24 of Fig. 22.

The substitution of item-keys 83 for each other and the removal of any of them from the slots it is located in, and further its location in another preferred set of slots of plates 6, 7, 8, 9 may be made in a quite simple manner by withdrawing and inserting said item-keys from and into plate slots. For such a purpose it is sufficient to cause all said plates 6, 7, 8, 9 of all groups to move forward to positions in which they permit of the passage of teeth of keys 83. For such a purpose, a special key similar to a key 83 and provided with cams for shifting all plates 6, 7, 8, 9 of all groups may be used. Such a key may be constructed according to the showing in Figs. 22, 23, and 24. The key 830 comprises four elements 270, 280, 290, and 300, which correspond to the elements 27, 28, 29, and 30 shown in Figs. 8 and 9 and which cooperate with the profiled edges of the openings 15, 16, 17, and 18 of plates 6, 7, 8, and 9. The thinnest parts 100 of key 830 correspond to base parts 27, 28, 29, and 30 of keys 83 and the sloped surfaces 101 correspond to the cam surfaces associated with the elements 27, 28, 29, and 30 of keys 83. The essential difference between keys 83 and 830 resides in the fact that the cam surfaces 102 of key 830 engage all plates 6, 7, 8, and 9, whereas the cam surfaces of keys 83 engage only certain selected plates 6, 7, 8, and 9. Obviously, upon inserting key 830 in one set of openings in plates 6, 7, 8, and 9, all of said plates will be shifted to permit the removal of keys 83.

What I claim as my invention and desire to secure by United States Letters Patent is:—

1. In a cash register or computing machine, a plurality of stops arranged in a row, parallel movable plates each cooperating with one of said stops for shifting it, each of said plates having slots and said slots being in register with each other in said several plates, engaging means on one edge of each of said plate slots, said engaging means being differently located in those of said plates which cooperate with said several stops, manipulating members each extending through registering slots in said plates, and means on each of said manipulating members cooperating with the engaging means of selected plates for selective actuation of said plates to shift said respective stops.

2. In a cash register or computing machine, shiftable setting in members arranged in several columns and rows, parallel movable plates each cooperating with one of said setting in members for shifting it, each of said plates having slots and said slots being in register with each other in said several plates, said plates being arranged in groups, each of which contains a number of plates corresponding to the number of columns of setting in members, engaging means carried by said plates, said engaging means being differently located in those of said plates which cooperate with said setting in members belonging to different columns, manipulating members each extending through registering slots of said plates, and means on each of said manipulating members cooperating with the engaging means of respective plates for selective actuation of said plates to shift said respective setting in members.

3. In a cash register or computing machine shiftable setting in members arranged in several columns and rows, parallel movable plates each cooperating with one of said setting in members for shifting it, each of said plates having slots in register with each other in said several plates, said plates being arranged in groups, each of which contains a number of plates corresponding to the number of columns of setting in members, the edges of said slots having the same shape in a portion of their extent in each plate and in the several plates and providing lugs differently located in the several plates and projecting into said slots in another portion of their extent, manipulating members each extending through registering slots of said plates, and means on each of said manipulating members cooperating with the respective plate lugs for selective actuation of said plates to shift said respective setting in members.

4. In a cash register or computing machine, shiftable setting in members arranged in several columns and rows, parallel movable plates each cooperating with one of said setting in members for shifting it, each of said plates having slots and said slots being in register with each other in said several plates, said plates being arranged in groups, each of which contains a number of plates corresponding to the number of columns of setting in members, cam-engaging on one edge of each of said plate slots, said cam-engaging being differently located in the ones of said plates which cooperate with said setting in members belonging to different columns, manipulating members each comprising a stem movable through registering slots of said plates and cams on said stem cooperating with the respective plate cam engaging for selective actuation of said plates to shift said respective setting in members.

ATTILIO ERRERA.